(12) United States Patent
Adam

(10) Patent No.: US 11,554,922 B2
(45) Date of Patent: Jan. 17, 2023

(54) DEVICE AND METHOD FOR CONVEYING PRODUCTS

(71) Applicant: SIDEL CANADA INC., Laval (CA)

(72) Inventor: Alex Adam, Laval (CA)

(73) Assignee: SIDEL CANADA INC., Laval (CA)

( * ) Notice: Subject to any disclaimer, the term of this patent is extended or adjusted under 35 U.S.C. 154(b) by 0 days.

(21) Appl. No.: 17/278,151

(22) PCT Filed: Sep. 19, 2018

(86) PCT No.: PCT/IB2018/001082
§ 371 (c)(1),
(2) Date: Mar. 19, 2021

(87) PCT Pub. No.: WO2020/058736
PCT Pub. Date: Mar. 26, 2020

(65) Prior Publication Data
US 2021/0347580 A1    Nov. 11, 2021

(51) Int. Cl.
*B65G 47/244* (2006.01)
*B65G 47/54* (2006.01)
*B65G 39/04* (2006.01)

(52) U.S. Cl.
CPC ........... *B65G 47/244* (2013.01); *B65G 47/54* (2013.01); *B65G 39/04* (2013.01)

(58) Field of Classification Search
CPC .. B65G 47/244; B65G 47/54; B65G 2207/18; B65G 39/04; B65G 2207/34
USPC ............................. 198/370.09, 371.3, 457.02
See application file for complete search history.

(56) References Cited

U.S. PATENT DOCUMENTS

| | | | | |
|---|---|---|---|---|
| 3,550,756 A | * | 12/1970 | Kornylak | B65G 13/10 198/779 |
| 4,907,692 A | | 3/1990 | Sogge | |
| 4,981,209 A | * | 1/1991 | Sogge | B65G 13/10 198/786 |
| 5,074,405 A | | 12/1991 | Magolske | |
| 5,551,543 A | * | 9/1996 | Mattingly | B65G 19/306 198/370.09 |
| 6,340,083 B1 | * | 1/2002 | Zhou | B65G 39/12 198/370.09 |
| 6,981,580 B2 | | 1/2006 | Meyer | |

(Continued)

FOREIGN PATENT DOCUMENTS

| | | | | |
|---|---|---|---|---|
| DE | 102015105317 | * | 10/2016 | ........... B65G 47/244 |
| JP | 58183521 | * | 10/1983 | ............ B65G 47/54 |

(Continued)

OTHER PUBLICATIONS

International Search Report dated May 24, 2019 for PCT/IB2018/001082.

*Primary Examiner* — James R Bidwell

(57) ABSTRACT

The present invention relates to a device for conveying products on a production line, comprising a section for moving said products longitudinally and another section for diverting said products in relation to said longitudinal movement. One of the sections comprises a plurality of Mecanum wheels compactly grouped in sets, and the device comprises a single means for driving the assembly of Mecanum wheels. The invention also relates to a corresponding method for conveying products.

20 Claims, 3 Drawing Sheets

(56) References Cited

U.S. PATENT DOCUMENTS

| | | | | |
|---|---|---|---|---|
| 8,474,596 | B2 * | 7/2013 | Wolkerstorfer | B65G 47/648 |
| | | | | 198/370.09 |
| 10,087,005 | B1 * | 10/2018 | Chiu | B65G 39/10 |
| 2007/0051585 | A1 * | 3/2007 | Scott | B65G 47/54 |
| | | | | 198/370.07 |
| 2011/0022221 | A1 * | 1/2011 | Fourney | B65G 17/24 |
| | | | | 198/370.09 |
| 2012/0298481 | A1 * | 11/2012 | Fourney | B65G 39/00 |
| | | | | 198/413 |
| 2013/0192954 | A1 * | 8/2013 | Fourney | B65G 39/04 |
| | | | | 198/786 |

FOREIGN PATENT DOCUMENTS

| | | | | |
|---|---|---|---|---|
| JP | H08-26471 A | | 1/1996 | |
| KR | 20160116084 | * | 10/2016 | ............. B65G 39/04 |
| RU | 2412885 | * | 3/2007 | ........... B65G 47/244 |

\* cited by examiner

DEVICE AND METHOD FOR CONVEYING PRODUCTS

The present invention is in the field of conveying products on a production line.

Products of this kind consist in containers, such as flasks, bottles, cans or waxed cartons, or again tins. These products are generally made of plastic material, metal or indeed glass.

The products undergo a first so-called production phase during which they are finalized one by one through a succession of a plurality of steps in corresponding modules, such as filling, closing and labelling.

Said products ready for use then undergo a second step of packaging in groups, each group being constituted by a quincunx or other grouping of a plurality of products in accordance with a matrix disposition, generally of square or rectangular, generally parallelepipedal shape. The products of the same group may be held together by inserting them into a container, such as a case or a carton, or indeed in the form of loads. The loads are produced by a pallet wrapping step, by means of a pallet wrapping machine type dedicated module. The groups of products are first wrapped in heat-shrink film. In a complementary manner, each group of products may be held at the lower end by means of a support forming a bottom, for example a cardboard tray, generally positioned before wrapping. Once wrapped, the groups of products pass through an oven, still in the pallet wrapping machine, in which the film shrinks around the products thus forming a load. These loads or cases are then conveyed with a view to handling them and transporting them, in particular as far as a palletization step in which a plurality of loads or cases are first arranged side by side in a predefined configuration so as to form a layer of products substantially occupying the surface area of a pallet. These layers are then stacked or piled up on the top of a pallet.

In the sense of the present invention, by "product" is meant a container on its own, such as a bottle or a waxed carton, as well as a group of products disposed in a tray, a case or grouped in load form.

In this context, the products are moved through a conveyor device along the production line between upstream and downstream modules, for example between the outlet of a pallet wrapping machine or a case packer and a palletization module.

A classic conveyor device may comprise a conveyor in the form of an endless belt on which the products rest and are then moved in a single longitudinal direction.

For various reasons, such as offering flexibility in terms of conveying products with distinct formats between different production runs, as well as enhancing movements and production throughputs, or again preparing layers of products with a view to palletizing them, it is often necessary to reorient the products as they move longitudinally. Such reorientation of the products may also be necessary in the case of operations to divide a flow of products when grouping said products by convergence, in particular in the case of a flow of products circulating on multiple paths.

It is therefore necessary to divert the trajectory of the products moved longitudinally by the conveyor device, in particular in accordance with a transverse component in order to orient the products toward the right or the left of said device or indeed with a rotary movement in order to cause them to turn on themselves.

It is readily understood that a classic endless belt conveyor enables the products to circulate only in their direction of forward movement, that is to say without diverting them.

To alleviate this drawback, there exists a conveyor device comprising a conveyor in the form of an endless belt, said belt being provided with motorized rollers mounted to rotate about axes oriented in the longitudinal direction of forward movement of the conveyor or inclined angularly, in particular at 45°, toward the right and/or toward the left relative to said longitudinal direction. Thus a product circulating on such a conveyor may in particular be diverted laterally as a function of the actuation in rotation of the rollers having the same orientation. An example of such a device is described in the document US 2001/0045346.

However, a major problem of this kind of roller conveyor resides in the complex drive train under the conveyor surface, which necessitates regular fastidious maintenance that is complicated to carry out. Moreover, the rollers have a large diameter, preventing the processing of some types of products, especially individual products, causing them to fall over. Finally, the conveyor surface has a thickness that induces a large curvature at the longitudinal ends of the conveyor, providing an interface with the other modules situated upstream and downstream, which it is necessary to fill in, in particular by plates on which the products slide and rub and are no longer driven.

An alternative solution resides in a modular conveyor constituted of a juxtaposition of modules of hexagonal shape, the adjacent modules being abutted along their respective edge, forming a plane and fixed surface. Each module comprises three wheels, each oriented parallel to an edge of the hexagon and separated from the other wheels by a contiguous edge. Each wheel has a rolling surface constituted of tangential rollers mounted to rotate freely. The three wheels are motorized independently, enabling a product to be diverted when it is supported by one of the wheels by actuating at least one of the other wheels of the same module or of an adjacent module, or even wheels of a plurality of adjacent modules. An example of such a device is described in the document WO 2014/012861.

This kind of conveyor has a similar drawback, residing in the spacing between the wheels, which does not allow the processing of certain types of products and limits conveying thereof to products boxed in rigid containers. Moreover, the major part of the surface of the conveyor is fixed, inducing a risk of the products toppling when they are no longer supported by at least three wheels, then coming to rub on said fixed surface. Once again, the drive train specific to each wheel renders any maintenance intervention complicated, even if it can be facilitated by demounting the module to be repaired. Moreover, managing the directions and the senses of movement of the products is extremely complicated, involving the combination of actuating rotation at variable speeds of each of the three wheels of each of the modules. Moreover, the actuation speeds are limited, preventing the conveying of products at high production throughputs. Finally, because of the numerous motors that it comprises, this kind of installation generates high manufacture and maintenance costs.

An object of the invention is to alleviate the drawbacks of the prior art by proposing a conveyor device diverting the products through a particular configuration of Mecanum wheels equipping certain sections of such a conveyor.

In this regard, a Mecanum wheel is a rolling member of globally circular shape. It comprises a hub in the form of a hollow shaft around which is mounted a rim. The particular feature of a Mecanum wheel resides in a rolling band comprising a plurality of rollers regularly distributed at the periphery, mounted to rotate freely on the rim, at an angular inclination of forty five degrees (45°) relative to its axis.

Mecanum wheels are usually employed as rolling members of a vehicle, in order to confer thereon enhanced mobility. To this end, four Mecanum wheels are mounted on a chassis in a parallelepipedal disposition. Moreover, they are motorized independently of one another. It is then possible by modifying the direction and the speed of rotation of each Mecanum wheel to cause the vehicle to move forward or backward longitudinally, but also to apply to it an orthogonal or slantwise transverse movement, and to cause it to turn by rotating on itself, and even to combine one and/or the other of these movements.

The invention then provides for integrating Mecanum wheels into a conveyor device in such a manner as to divert the products transported. To this end, the Mecanum wheels are grouped identically in sets, each set being specifically disposed relative to the longitudinal conveying movement, in such a manner as to induce a particular diversion of the products, laterally toward the right or the left, or again in rotation. Moreover, in order to simplify the operation of the conveyor device, the invention provides a single unit for motorizing the sets of wheels of the same diverter section, reducing manufacture and installation costs, and maintenance operations.

To this end, the invention concerns device for conveying products on a production line, comprising:
  at least one section for moving said products longitudinally;
  at least one other section for diverting said products relative to said longitudinal movement.

This kind of conveyor device is characterized in that said other section comprises a plurality of Mecanum wheels compactly grouped in sets of wheels aligned in a direction perpendicular to their rotation axis;
  said wheels of the same set being identically oriented.

Moreover, the conveyor device is characterized in that it comprises a single means of motorizing all the Mecanum wheels of the same other section.

In accordance with non-limiting additional features of the conveyor device, said other, diverter section may comprise at least two sets of identically oriented Mecanum wheels in such a manner as to constitute another section for diverting said products laterally to the right or to the left of said device.

Said other, diverter section may comprise at least two sets of symmetrically oriented Mecanum wheels in such a manner as to constitute another section for rotationally diverting said products.

Said conveyor device may comprise a plurality of different and independent other, diverter sections.

The axis of the Mecanum wheels of another section may be orthogonal to or aligned with the direction of the longitudinal movement.

A plurality of wheels of different sets may be contiguous along their rotation axis.

At least two sets of the same other section may be separated transversely by at least one longitudinal conveyor.

Said longitudinal conveyor may comprise a conveyor provided with rollers mounted to rotate freely and the rotation axes of which are oriented longitudinally.

Said conveyor device may comprise at least one lateral guide on which said products slide.

The invention also concerns a method of conveying products on a production line, in which, at least:
  the products are moved longitudinally over at least one section;
  said products are diverted relative to the longitudinal movement over at least one other section.

This kind of conveying method is characterized in that:
  there are in said other section a plurality of Mecanum wheels compactly grouped in sets of wheels aligned in a direction perpendicular to their rotation axis; and in that:
  the Mecanum wheels of the same other section are actuated by a single driving means.

Other features and advantages of the invention will emerge from the following detailed description of nonlimiting embodiments of the invention with reference to the appended drawings in which.

Figure 6:
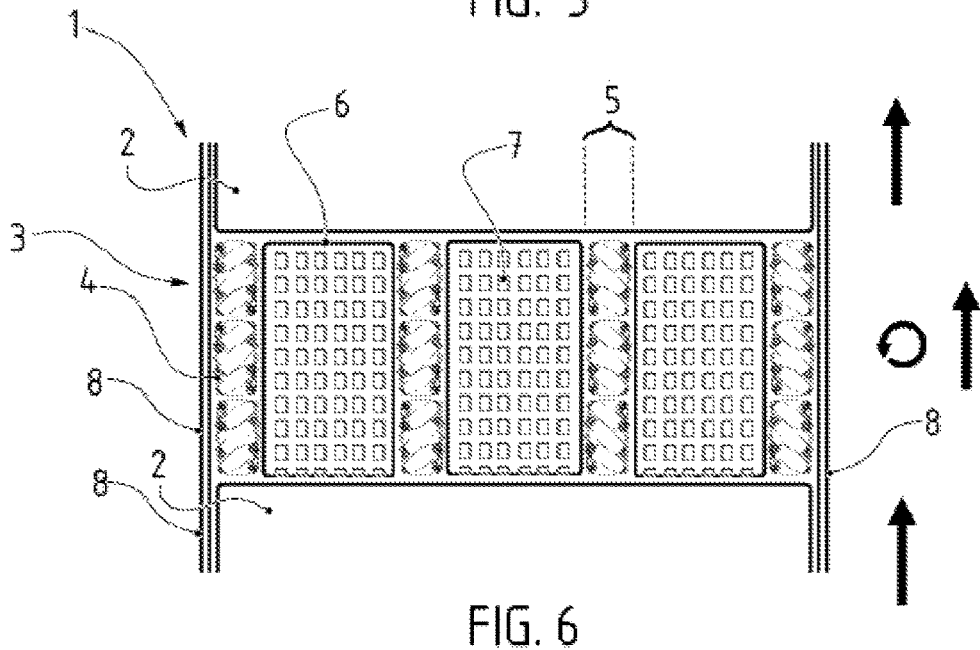
Figure 7:
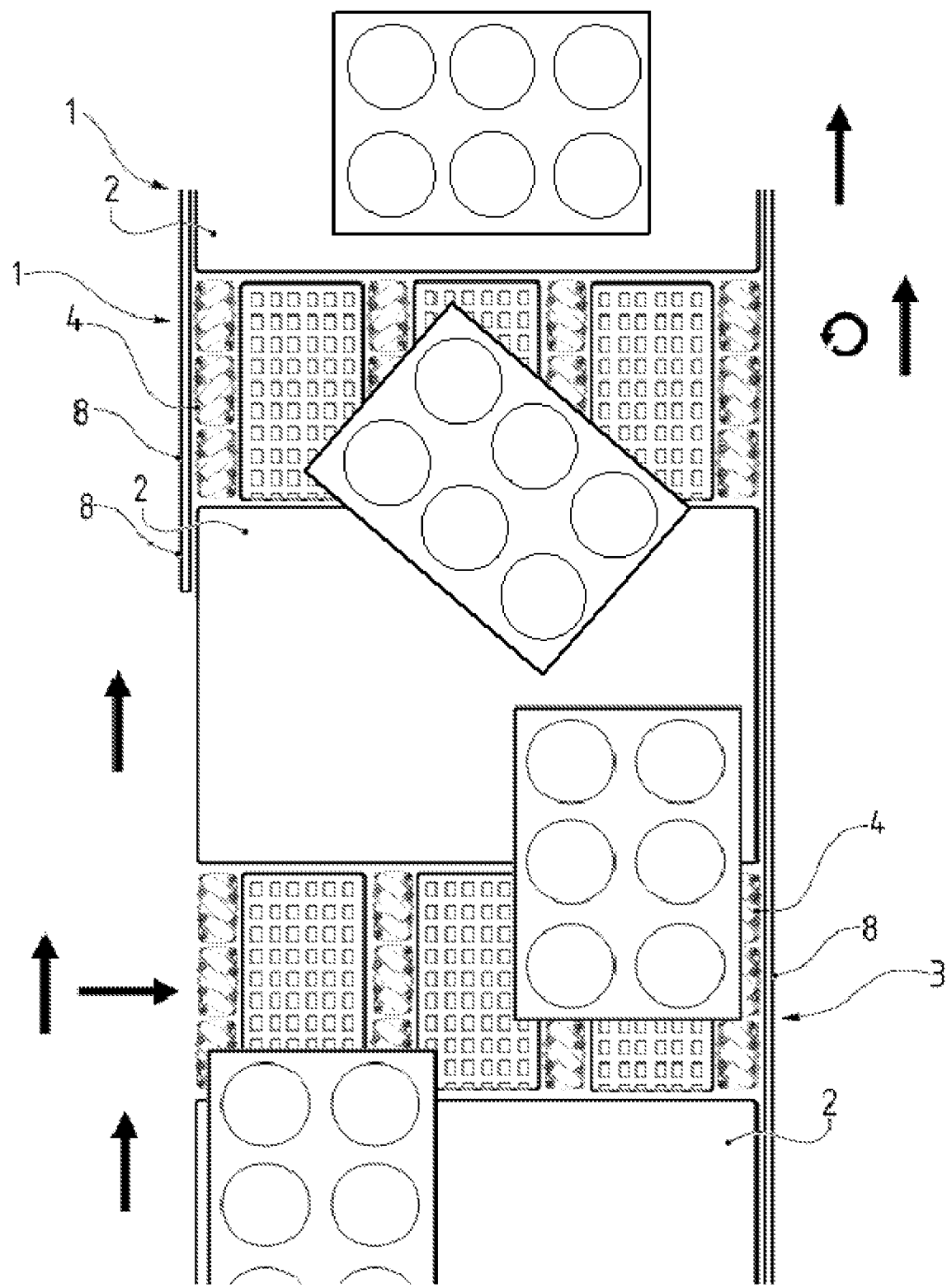

FIG. 6 represents schematically a view from above of a conveyor device in accordance with a fourth embodiment, showing sets of Mecanum wheels separated by longitudinal conveyors provided with idler wheels, with two sets in which the wheels have a first orientation, while two other sets are disposed symmetrically with their Mecanum wheels oriented differently; the Mecanum wheels represented in this figure are oriented in such a manner as to impart to the conveyed products a diversion in rotation; and FIG. 7 represents schematically a view from above of a conveyor device in accordance with a fifth embodiment, with a plurality of distinct other, diverter sections disposed between longitudinal movement sections.

The present invention concerns the conveying of products on a production line.

Such products may be containers, such as flasks, bottles, cans or waxed cartons, or again tins. The products may be conveyed one by one or in groups, in particular in containers, such as a box, or held together in a load.

To this end, the invention concerns a conveyor device 1. The products are transported on the upper face of a device 1 of this kind.

The conveyor device 1 comprises at least one section 2 for moving the product longitudinally. This longitudinal movement is from an upstream module to a downstream module.

In accordance with the non-limiting embodiments represented in the figures, the conveyor device 1 comprises an upstream section 2 and a downstream section 2. Moreover, the direction of longitudinal movement is schematically represented by arrows extending vertically upward.

Each section 2 may consist of an appropriate conveyor surface, for example a conveyor in the form of an endless belt. Each section 2 may have a dedicated drive train with its own forward speed.

The conveyor device 1 advantageously comprises at least one other section 3 for diverting said products relative to said longitudinal movement. In other words, another section 3 imparts to the products that are transported therein a supplementary movement in a direction different from the direction of longitudinal movement of a section 2.

The diversion direction may be transverse relative to said longitudinal direction of movement, with an angularly inclined resultant. In accordance with the first and second embodiments respectively represented in FIGS. 1 and 2, the diversion direction is transverse, oriented orthogonally to the right. In accordance with the third embodiment represented in FIG. 5 the diversion direction is transverse, oriented orthogonally to the left.

The diversion direction may also apply a movement in rotation to the products, as can be seen in the example of the fourth embodiment from FIG. 6.

It will be noted that the diversion component may apply in combination with the longitudinal movement, conferring an angularly inclined or more complex resultant, as in the case of a movement in translation combined with a rotation.

Additionally, it is also possible momentarily to cancel the longitudinal component of forward movement of the products along the conveyor device 1, in particular by applying a diversion in accordance with an opposite component, i.e. toward the rear, combined with at least one transverse component enabling the products to be diverted laterally or to be caused to turn on themselves.

Moreover, another section 3 corresponds only to a given diversion direction. Then, in order to impose on a product a plurality of distinct diversion directions, it is necessary to convey it along as many other sections 3.

Moreover, a plurality of other sections 3 may follow on one behind the other or be separated by one or more sections 2.

As indicated above, said other section 3 comprises a plurality of Mecanum wheels 4.

Figure 1:
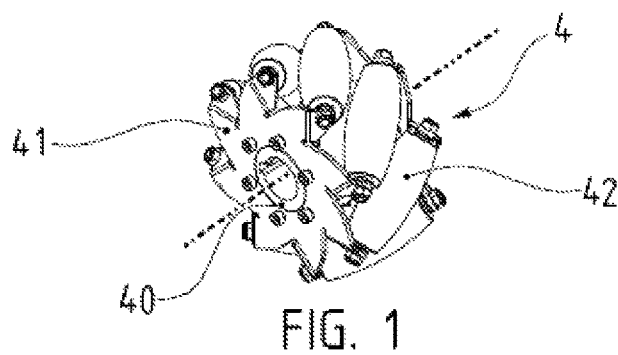
FIG. 1 represents schematically a perspective view of a Mecanum wheel.

An example of a Mecanum wheel 4 is represented in FIG. 1. As previously mentioned, a Mecanum wheel 4 is a rolling member of globally circular shape. It comprises a hub 40 in the form of a hollow shaft around which is mounted a rim 41. The hollow shaft of the hub 40 is intended to receive a shaft driving rotation of said Mecanum wheel 4 about the rotation axis. The rotation axis is modelled schematically by the dashed lines in FIG. 1. The particular feature of a Mecanum wheel resides in a rolling band comprising a plurality of rollers 42 regularly distributed at the periphery, mounted to rotate freely on the rim 41 at an angular inclination of 45° relative to its axis.

As can be seen in the example from FIG. 1, each rim 41 is star-shaped, the points whereof receive the ends of the free rotation axes of the rollers 42. Moreover, the rollers 42 have an oblong convex shape.

The Mecanum wheels 4 are compactly grouped in sets 5 of Mecanum wheels 4 aligned in a direction perpendicular to their rotation axis. In other words, the Mecanum wheels 4 of the same set 5 are disposed side by side, with a clearance allowing rotation without contact between them. The rotation axes of the Mecanum wheels 4 of the same set 5 are parallel. Moreover, all the rotation axes of the Mecanum wheels 4 of the same set 5 lie in the same plane, preferably a horizontal plane.

The same set 5 comprises a plurality of Mecanum wheels 4, i.e. at least two Mecanum wheels 4, preferably but not limitingly at least three wheels, as represented in the embodiments that can be seen in FIGS. 2 to 6.

Moreover, the Mecanum wheels 4 of the same set 5 are identically oriented. In other words, the Mecanum wheels 4 of the same set 5 are positioned one behind the other with their rollers 42 in the same direction.

The sets 5 of the same other section 3 may have an identical orientation of their Mecanum wheels 4 or an opposite orientation depending on the diversion that it is wished to impose on the products. As can be seen in some embodiments visible in FIGS. 2, 3 and 5, the sets 5 of each other section 3 are oriented in the same direction. In accordance with the fourth embodiment that can be seen in FIG. 6, sets 5 have different orientations of their Mecanum wheels 4.

Each other section 3 may comprise at least one set 5, preferably a plurality of sets 5.

Figure 2:
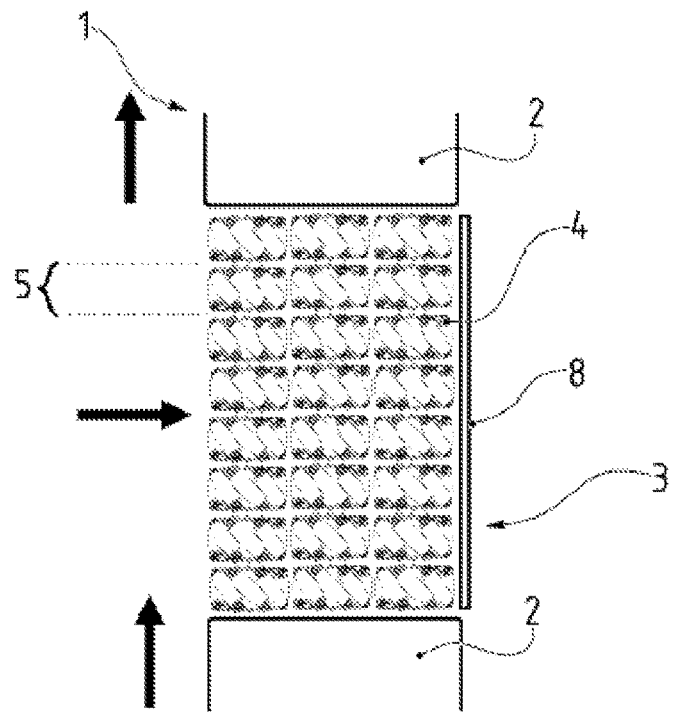
FIG. 2 represents schematically a view from above of a conveyor device in accordance with a first embodiment, showing an upstream longitudinal movement section and a downstream longitudinal movement section between which extends another section for diverting the products, said other section being provided only with sets of Mecanum wheels.

The sets 5 may be continuous, back to back with one another with a clearance enabling rotation of the wheels. A configuration of this kind is represented in the first embodiment from FIG. 2, showing by way of example another section 3 consisting of eight lots 5 each of three Mecanum wheels 4. Moreover, the rotation axes of the Mecanum wheels 4 are oriented in the longitudinal direction, i.e. vertically in the example represented here.

The axis of the Mecanum wheels 4 of another section 3 is then orthogonal to or aligned with the direction of longitudinal movement.

The sets 5 may be separated by a longitudinal conveyor 6. A conveyor 6 may be situated in an intermediate manner between two sets 5. A configuration of this kind can be seen in FIGS. 3, 5 and 6. In accordance with another configuration, not represented, a conveyor 6 may be situated at the end of the device 1, then having only its opposite edge flanked by one or more sets 5 of Mecanum wheels 4.

In accordance with yet another configuration, not represented, the same conveyor 6 may extend along a plurality of successive other sections 3.

A conveyor 6 of this kind is driven in the longitudinal direction.

Figure 5:
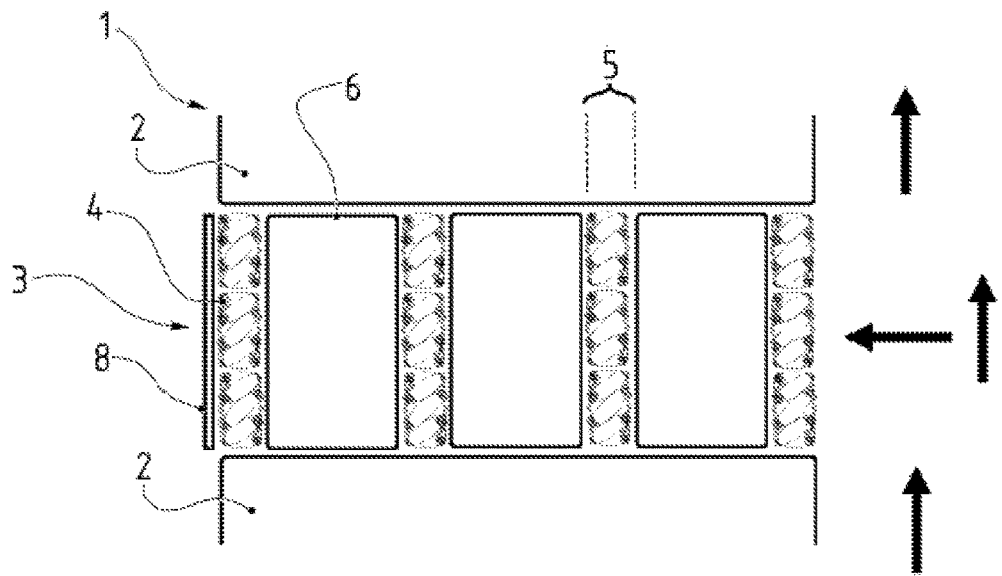
FIG. 5 represents schematically a view from above of a conveyor device in accordance with a third embodiment, showing sets of Mecanum wheels separated by longitudinal conveyors, said Mecanum wheels being oriented in such a manner as to impart to the conveyed products a second diverted direction, for example to the left.

In this regard, in accordance with one embodiment, as can be seen in FIG. 5, said longitudinal conveyor 6 may be of the endless belt type. It comprises a belt intended to receive only on its upper face a part of each product.

Figure 3:
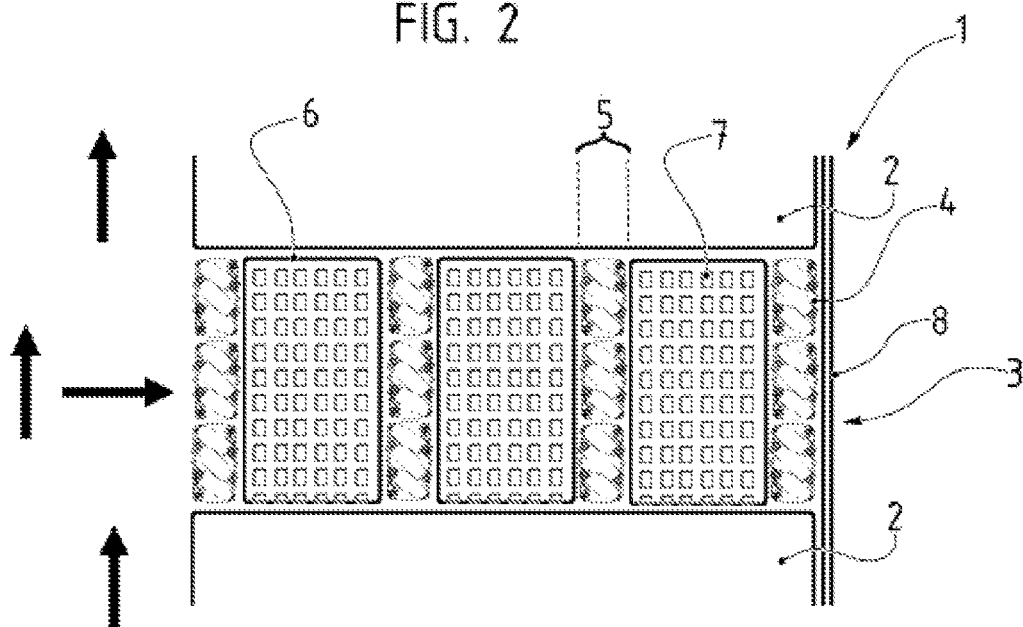
FIG. 3 represents schematically a view from above of a conveyor device in accordance with a second embodiment, in which another, diverter section comprises sets of Mecanum wheels separated by longitudinal conveyors, said Mecanum wheels being oriented in such a manner as to impart to the conveyed products a first diverted direction, for example to the right.

In accordance with another preferred embodiment, as can be seen in FIGS. 3 and 6, the conveyor 6 may comprise a conveyor provided with rollers 7 mounted to rotate freely and the rotation axes of which are oriented longitudinally. The rollers 7 therefore accompany the diverted movement of the products, by virtue of the rolling thereof, whilst applying the longitudinal driving component of said conveyor 6. The surface of the conveyor 6 then constitutes a rolling sole piece.

In accordance with a preferred embodiment, as can be seen in the embodiments represented in FIGS. 2, 3, 5 and 6, the device 1 may comprise at least one lateral guide 8 along which the products slide. A guide 8 of this kind is positioned along an edge of another section 3, ensuring transverse referencing of products as they move, i.e. serving as an abutment for aligning the products during and at the end of the diversion thereof. Each guide 8 may also ensure that the products do not project beyond the edge of the device 1 during diversion thereof.

As can be seen in the embodiments from FIGS. 2 and 5, the guide 8 extends only over the length of the other section 3. Moreover, the guide 8 is generally positioned on the side corresponding to the diversion direction.

In accordance with another embodiment, a guide 8 may extend along another section 3 and along one or more of the upstream and/or downstream sections 2. A configuration of this kind can be seen in the embodiment from FIGS. 3 and 6.

Moreover, a guide 8 may be positioned on each side of another section 3, as can be seen in FIG. 6.

In accordance with one embodiment, said lateral guide 8 comprises rolling means mounted to rotate freely or to be driven in rotation in the longitudinal direction. Rolling means of this kind accompany products coming into contact therewith, no friction interfering with the longitudinal driving and/or the diversion.

Moreover, when there is a plurality of conveyors 6 in the same other section 3 they may have a single drive train or a servocontrolled drive train in order to ensure the same speed of longitudinal movement of said products that they transport and partly support.

In fact, the transverse dimensions of a conveyor 6 ensure that, depending on the type of products, but also on their dimensions, at least a part of each product also rests on at least one Mecanum wheel 4 of at least one set 5, preferably simultaneously on a plurality of Mecanum wheels 4 of a plurality of sets 5.

Figure 4:
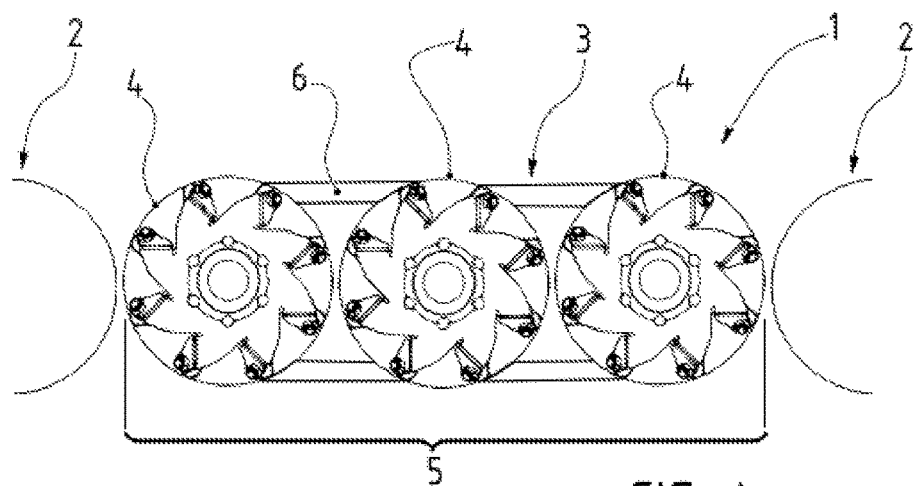
FIG. 4 represents schematically a view in vertical section of FIG. 3, showing in particular a set of three Mecanum wheels flush with the surface of a conveyor.

In this regard, the Mecanum wheels 4 may be flush with the upper surface of a conveyor 6, as can be seen in the example from FIG. 4. Accordingly, a product transported by one other section 3 finds itself supported in part by at least one Mecanum wheel 4, preferably a plurality thereof simultaneously, as well as possibly by the surface of at least one conveyor 6 if such a conveyor 6 is situated between two sets 5.

As mentioned above, another, diverter section 3 may then comprise at least two sets 5 of identically oriented Mecanum wheels 4 so as to constitute another section for laterally diverting said products to the right or to the left of said device 1. Diversion to the right is represented in the embodiments from FIGS. 2 and 3 while diversion to the left is represented in FIG. 5.

Alternatively, said other, diverter section 3 comprises at least two sets 5 of symmetrically oriented Mecanum wheels 4 in such a manner as to constitute another section 3 for diverting said products in rotation. A configuration of this kind can be seen in FIG. 6, showing a pair of sets 5 situated on the left with a first orientation while another pair of sets 5 situated on the right has another, in particular opposite, orientation, in such a manner as to impart to the products a direction of diversion through a movement in rotation.

As indicated hereinabove, the device 1 comprises only one drive train for all of the Mecanum wheels 5 of the same other section 3. For each other section 3 the device therefore provides a distinct drive train specific to each of them.

It is then possible to apply driving in rotation independently to each other section 3 in order to confer a different diversion on the products that are transported thereon.

Moreover, actuation of the drive train specific to each other section 3 may be effected continuously or discontinuously. Accordingly, when transporting a product on said other section 3, the drive train of the other section 3 may be actuated with a duration and/or speed that is/are configurable in order to apply the diversion direction to said product until it is brought into the required position.

The rotation axes of the Mecanum wheels 4 situated in the same longitudinal column, as can be seen in FIG. 2, or in the same transverse row, as can be seen in FIGS. 3, 5 and 6, coincide. These coinciding axes may be connected by a same rotation shaft. A plurality of shafts then connect the Mecanum wheels 4 by column or rows of the different sets 5 of the same other section 3, ensuring common driving in rotation. Moreover, the shafts of the different columns or rows are in principle servocontrolled from the same drive train, then ensuring the same rotation speed is applied to each Mecanum wheel 4 of the same other section 3.

Varying the speed at which the sets 5 of Mecanum wheels 4 of the same other section 3 are driven in rotation then imposes a configurable diversion on the products in addition to choosing the speed of their longitudinal movement.

In the case of a conveyor 6 situated between at least two sets 5 of another section 3, it is furthermore possible to apply a difference between the drive speeds of said conveyor 6 relative to the Mecanum wheels 4 of the sets 5. Such a difference may be positive or negative, or neutral if the conveyor 6 is driven at the same speed as the wheels 4. It is then possible precisely to adjust the movements to be applied to the products transported on each other section 3.

The invention also concerns a method of conveying products on a production line.

A conveying method of this kind is particularly suitable for use of the conveyor device 1 in accordance with the invention.

During this method, the products are at least moved longitudinally over at least one section 2. In particular, the products are moved longitudinally at the level of an upstream and/or a downstream section 2.

Moreover, in accordance with the invention, said products are diverted relative to the longitudinal movement over at least one other section 3. This diversion is effected in a complementary manner to the longitudinal movement.

A plurality of Mecanum wheels 4 is advantageously disposed at the level of said other sections 3, compactly grouped in sets 5 of Mecanum wheels 4 aligned in a direction perpendicular to their rotation axis.

The Mecanum wheels 4 of the same other section 3 are then driven by a single drive train, i.e. all the Mecanum wheels 4 of the same other section 3 are caused to turn at the same drive speed.

Referring to FIG. 7, a plurality of products are transported successively by the conveyor device 1. In this specific non-limiting configuration the device 1 comprises an upstream section 2 moving the products to another section 3 effecting a transverse diversion to the right before arriving at an intermediate section 2 in which the products are moved only longitudinally. The products then cross another section 3 to be diverted in rotation, for example by an angle of ninety degrees (90°), to be found on leaving aligned at the center of a downstream section 2 where they are again transported only longitudinally.

Accordingly, through the use of Mecanum wheels 4 in sets 5 to convey products, the invention enables a precise diversion to be applied to said products relative to their longitudinal forward movement whilst maintaining that longitudinal driving. The single drive train considerably facilitates the manufacture and the maintenance of a conveyor device of this kind, at lower cost.

The invention claimed is:

1. A device (1) for conveying products on a production line, comprising:
    at least one section (2) upstream for moving said products in a first orientation in a longitudinal direction;
    at least one other section (3) for diverting said products into a second orientation relative to said longitudinal direction; and at least one section (2) downstream for moving said products in the second orientation in the longitudinal direction,
wherein
said other section (3) comprises a plurality of Mecanum wheels (4) compactly grouped in sets (5) of wheels (4) aligned in a direction perpendicular to their rotation axis;
said wheels (4) of the same set (5) being identically oriented and on the same plane as the upstream section and the downstream section;
the device (1) comprises a single means of motorizing all the Mecanum wheels (4) of one or more sets (5) of the other section (3).

2. The conveyor device (1) as claimed in claim 1, wherein said other, diverter section (3) comprises at least two sets (5) of identically oriented Mecanum wheels (4) in such a manner as to constitute another section (3) for diverting said products laterally to the right or to the left of said device (1).

3. The conveyor device (1) as claimed in claim 1, wherein said other, diverter section (3) comprises at least two sets (5) of symmetrically oriented Mecanum wheels (4) in such a manner as to constitute another section (3) for rotationally diverting said products.

4. The conveyor device (1) as claimed in claim 1, further comprising a plurality of different and independent other, diverter sections (3).

5. The conveyor device (1) as claimed in claim 1, wherein the axis of the Mecanum wheels (4) of another section (3) is orthogonal to or aligned with the direction of the longitudinal movement.

6. The conveyor device (1) as claimed in claim 1, wherein a plurality of wheels (4) of different sets (5) are contiguous along their rotation axis.

7. The conveyor device (1) as claimed in claim 1, wherein at least two sets (5) of the same other section (3) are separated transversely by at least one longitudinal conveyor (6).

8. The conveyor device (1) as claimed in claim 7, wherein said longitudinal conveyor (6) comprises a conveyor provided with rollers (7) mounted to rotate freely and the rotation axes of which are oriented longitudinally.

9. The conveyor device (1) as claimed in claim 1, further comprising at least one lateral guide (8) on which said products slide.

10. A method of conveying products on a production line, in which, at least:
the products are moved in a longitudinal direction over at least one upstream section (2) in a first orientation;
said products are diverted into a second orientation relative to the longitudinal direction over at least one other section (3); and
the products are moved in a longitudinal direction over at least one downstream section (2) in a the second orientation;
wherein:
there are in said other section (3) a plurality of Mecanum wheels (4) compactly grouped in sets (5) of wheels (4) aligned in a direction perpendicular to their rotation axis; and
the Mecanum wheels (4) of the same other section (3) are actuated by a single drive means.

11. The conveyor device (1) as claimed in claim 2, further comprising a plurality of different and independent other, diverter sections (3).

12. The conveyor device (1) as claimed in claim 3, further comprising a plurality of different and independent other, diverter sections (3).

13. The conveyor device (1) as claimed in claim 2, wherein the axis of the Mecanum wheels (4) of another section (3) is orthogonal to or aligned with the direction of the longitudinal movement.

14. The conveyor device (1) as claimed in claim 3, wherein the axis of the Mecanum wheels (4) of another section (3) is orthogonal to or aligned with the direction of the longitudinal movement.

15. The conveyor device (1) as claimed in claim 2, wherein a plurality of wheels (4) of different sets (5) are contiguous along their rotation axis.

16. The conveyor device (1) as claimed in claim 3, wherein a plurality of wheels (4) of different sets (5) are contiguous along their rotation axis.

17. The conveyor device (1) as claimed in claim 2, wherein at least two sets (5) of the same other section (3) are separated transversely by at least one longitudinal conveyor (6).

18. The conveyor device (1) as claimed in claim 3, wherein at least two sets (5) of the same other section (3) are separated transversely by at least one longitudinal conveyor (6).

19. The conveyor device (1) as claimed in claim 2, further comprising at least one lateral guide (8) on which said products slide.

20. The conveyor device (1) as claimed in claim 3, further comprising at least one lateral guide (8) on which said products slide.

* * * * *